(12) United States Patent
Khan (10) Patent No.: US 8,195,120 B2
(45) Date of Patent: Jun. 5, 2012

(54) PRECEDENCE AND PREEMPTION EXTENSION FOR REMOTE TERMINALS

(75) Inventor: Rahil Khan, Frisco, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1064 days.

(21) Appl. No.: 12/046,000

(22) Filed: Mar. 11, 2008

(65) Prior Publication Data

US 2009/0232091 A1    Sep. 17, 2009

(51) Int. Cl.
*H04M 11/00*    (2006.01)

(52) U.S. Cl. ...................................................... 455/403

(58) Field of Classification Search .................... None
See application file for complete search history.

(56) References Cited

U.S. PATENT DOCUMENTS

| | | | |
|---|---|---|---|
| 6,385,458 B1 * | 5/2002 | Papadimitriou et al. | 455/456.2 |
| 7,203,163 B1 * | 4/2007 | Hundscheidt et al. | 370/230 |
| 7,801,035 B2 * | 9/2010 | Hundscheidt et al. | 370/230 |
| 2004/0198357 A1 | 10/2004 | Plyle et al. | |
| 2007/0133563 A1 * | 6/2007 | Hundscheidt et al. | 370/395.43 |
| 2008/0076421 A1 * | 3/2008 | Schwarz | 455/435.3 |

OTHER PUBLICATIONS

3rd Generation Partnership Project; Technical Specification 24.067 V7.0.0, Group Core Network; enhanced Multi-Level Precedence and Pre-emption service (eMLPP)—Stage 3, Release 7.
3rd Generation Partnership Project; Technical Specification 22.173 V7.0.0, Group Services and System Aspects; IP Multimedia Core Network Subsystem (IMS) Multimedia Telephony Service and supplementary services Stage 1; (Release 7).
Digital cellular telecommunications system (Phase 2+); Universal Mobile Telecommunications System (UMTS); Enhanced Multi-Level Precedence and Preemption Service (EMLPP); Stage 2 (3GPP TS 23.067 version 5.0.0 Release 5); ETSI TS 123 067, Jun. 2002.
Rosenberg, J. et al. SIP: Session Initiation Protocol. Network Working Group; Request for Comments: 3261; Jun. 2002.
Garcia-Martin, M. et al. Private Header (P-Header) Extensions to the Session Initiation Protocol (SIP) for the 3rd-Generation Partnership Project (3GPP). Network Working Group; Request for Comments: 3455; Jan. 2003.

* cited by examiner

*Primary Examiner* — Chi Pham
*Assistant Examiner* — Fan Ng
(74) *Attorney, Agent, or Firm* — Roger S. Burleigh (57) ABSTRACT

Precedence and preemption may be extended for remote terminals. In an example embodiment, a communication node implements a method with respect to a communications system that implements an enhanced multi-level precedence and preemption (eMLPP) scheme. The method includes acts of receiving, mapping, and transmitting. An incoming connection establishment communication having a priority-header value that indicates a priority for a connection to be established is received at the communication node. The priority-header value is mapped to an eMLPP value that indicates a precedence and preemption level for the connection to be established. An outgoing connection establishment communication having the eMLPP value is transmitted from the communication node.

15 Claims, 8 Drawing Sheets

PRECEDENCE AND PREEMPTION EXTENSION FOR REMOTE TERMINALS

TECHNICAL FIELD

The present invention relates generally to prioritization of connections in communications systems.

BACKGROUND

Many specialized terms and abbreviations are used in the communications arts. At least some of the following are referred to within the text that follows, such as in this background and/or the description sections. Thus, the following terms and abbreviations are herewith defined:
- 3GPP 3rd Generation Partnership Project
- BSC Base Station Controller
- BTS Base Transceiver Station
- CDMA Code Division Multiple Access
- CS Circuit Switch
- CSCF Call/Session Control Function
- EDGE Enhanced Data for GSM Evolution
- eMLPP enhanced Multi-Level Precedence and Pre-emption
- GETS Government Emergency Telecommunications System
- GGSN Gateway GPRS Service Node
- GPRS General Packet Radio Service
- GSM Global System for Mobile Communications
- HSPA High-Speed Packet Access
- IETF Internet Engineering Task Force
- IMS IP Multimedia Core Network Subsystem
- IP Internet Protocol
- IP-CAN IP-Connectivity Access Network
- MMtel Multi-Media Fixed and Wireless Telephony
- MS Mobile Station
- MTAS Mobile Telephony Application Server
- MGw Media Gateway
- MSC Mobile Switching Center
- MTSI Mobile Telephony Service for IMS
- NGN Next Generation Network
- Node B UMTS Base Station
- P-CSCF Proxy CSCF
- PDSN Packet Data Serving Node
- PSTN Public Switched Telephone Network
- QoS Quality of Service
- RBS Radio Base Station
- RNC Radio Network Controller
- SGSN Serving GPRS Service Node
- SIP Session Initiation Protocol
- SS Subscriber Station
- TIPHON Telecomm and IP Harmonization Over Networks
- TISPAN TIPHON Services and Protocols for Advanced Networks
- UMTS Universal Mobile Telecommunications System
- UE User Equipment
- URI Uniform Resource Identifier
- URL Uniform or Universal Resource Locator
- VoIP Voice over Internet Protocol
- WCDMA Wideband CDMA
- WIMAX Worldwide Interoperability for Microwave Access
- WPS Wireless Priority Service The availability of electronic communications is typically limited by a finite resource: the communications channel. With wireline communications, the number and bandwidth of individual transport media that have been created limit the overall size of the communications channel. With wireless communications, the finite nature of the electromagnetic spectrum, as well as governmentally-assigned portions thereof, limits the overall size of the communication channel.

Because communication channels are effectively a finite resource at any given moment, different communication connections may be assigned different priority statuses. For instance, a communication from an emergency responder should generally be given a higher priority status than a standard communication between two civilians. Thus, when the communications channel is congested, a communication connection from the emergency responder can be enabled instead of a civilian one due to its higher priority status.

The prioritization of communications by emergency responders can potentially save lives. Prioritization of communication connections can also be used for other purposes. For example, governmental entities in general may be given relatively higher priority levels. Connection prioritization can also be used to smooth bandwidth demands, enforce offered levels of QoS, and so forth.

One approach to implementing a priority system is the eMLPP scheme. An example eMLPP scheme is described, for example, in "3rd Generation Partnership Project; Technical Specification 24.067 V7.0.0, Group Core Network; enhanced Multi-Level Precedence and Pre-emption service (eMLPP)—Stage 3, Release 7 [2007-06]". This document includes sections devoted to mobile originated calls, mobile terminated calls, called party preemption for mobile terminated calls, and group or broadcast calls for calling and called mobile stations. With Technical Specification 24.067, eMLPP can be implemented as a supplementary service.

Technical Specification 24.067 describes how calls can be established so as to enable prioritization of one connection over another. Moreover, it describes both precedence and preemption. From one perspective, precedence enables a higher priority connection to be granted one of a limited number of communication channels over a lower priority connection. Preemption, on the other hand, enables a higher priority connection to supplant an existing lower priority connection.

With precedence and preemption in accordance with eMLPP, for example, both society in general and individual users can prioritize communication connections. For instance, governmental entities that are responding to a disaster may be given precedence over other communication connections. Also, a parent may grant preemption rights to incoming calls from a babysitter over calls from friends.

Unfortunately, there is a deficiency in the foregoing state of the art with regard to accessibility of these precedence and preemption features in the context of eMLPP. Consequently, there is a need to address the accessibility deficiency. This deficiency and other needs are addressed by one or more of the various embodiments of the present invention.

SUMMARY

It is an object of the present invention to extend the benefit(s) of precedence and preemption that can be provided in accordance with eMLPP.

In an example embodiment, a communication node is operable with a communications system that implements an eMLPP scheme. The communication node includes an input unit, an output unit, a priority mapper, and a priority mapping controller. The input unit is to receive an incoming connection establishment communication having a priority-header value that indicates a priority for a connection to be established. The output unit is to transmit an outgoing connection establishment communication having an eMLPP value that indicates a precedence and preemption level for the connection to be established. The priority mapper is to map priority-header priorities to eMLPP levels. The priority mapper includes a priority association data structure that associates one or more priority-header priorities to each of multiple eMLPP levels, with the priority association data structure including an entry that associates the priority-header value with the eMLPP value. The priority mapping controller is to: accept the incoming connection establishment communication from the input unit, extract the priority-header value from the incoming connection establishment communication, provide the priority-header value to the priority mapper, accept from the priority mapper the eMLPP value that is associated with the priority-header value, and forward the eMLPP value to the output unit.

In another example embodiment, there is a method for a communication node with respect to a communications system that implements an eMLPP scheme. The method includes acts of receiving, mapping, and transmitting. An incoming connection establishment communication having a priority-header value that indicates a priority for a connection to be established is received at the communication node. The priority-header value is mapped to an eMLPP value that indicates a precedence and preemption level for the connection to be established. An outgoing connection establishment communication having the eMLPP value is transmitted from the communication node.

In yet another example embodiment, there is a method with respect to a communications system that implements an eMLPP scheme. The method includes acts of receiving communications, requesting, receiving an eMLPP value, and providing. From a first technological domain, one or more communications related to a handover operation for a current connection are received. The one or more communications include an identifier of a remote terminal involved in the handover operation. An eMLPP value associated with the remote terminal for the current connection is requested with reference to the remote terminal identifier. The eMLPP value indicates a precedence and preemption level for the current connection. The eMLPP value that is associated with the remote terminal for the current connection is received. The eMLPP value is provided to a second technological domain that is a target of the handover operation. In still another example embodiment, this method may be implemented by a communication node that is executing processor-executable instructions.

An advantage of certain embodiment(s) of the present invention is that the benefit(s) of precedence and preemption may be extended to remote terminals that are not pre-configured to establish a precedence and preemption level in accordance with eMLPP schemes.

Another advantage of certain embodiment(s) of the present invention is that the benefit(s) of precedence and preemption in accordance with eMLPP schemes may be extended to remote terminals that are involved in handover procedures between two different technological domains.

Yet another advantage of certain embodiment(s) of the present invention is that the benefit(s) of precedence and preemption in accordance with eMLPP schemes may be extended to remote terminals in the context of emergencies and official entity prioritization with regard to governmental regulations and other requirements.

Additional aspects of the invention are set forth, in part, in the detailed description, drawings, and claims that follow, and in part may be derived from the detailed description, or can be learned by practice of the invention. It is to be understood that both the foregoing general description and the following detailed description are exemplary and explanatory only and are not restrictive of the invention as disclosed or as claimed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
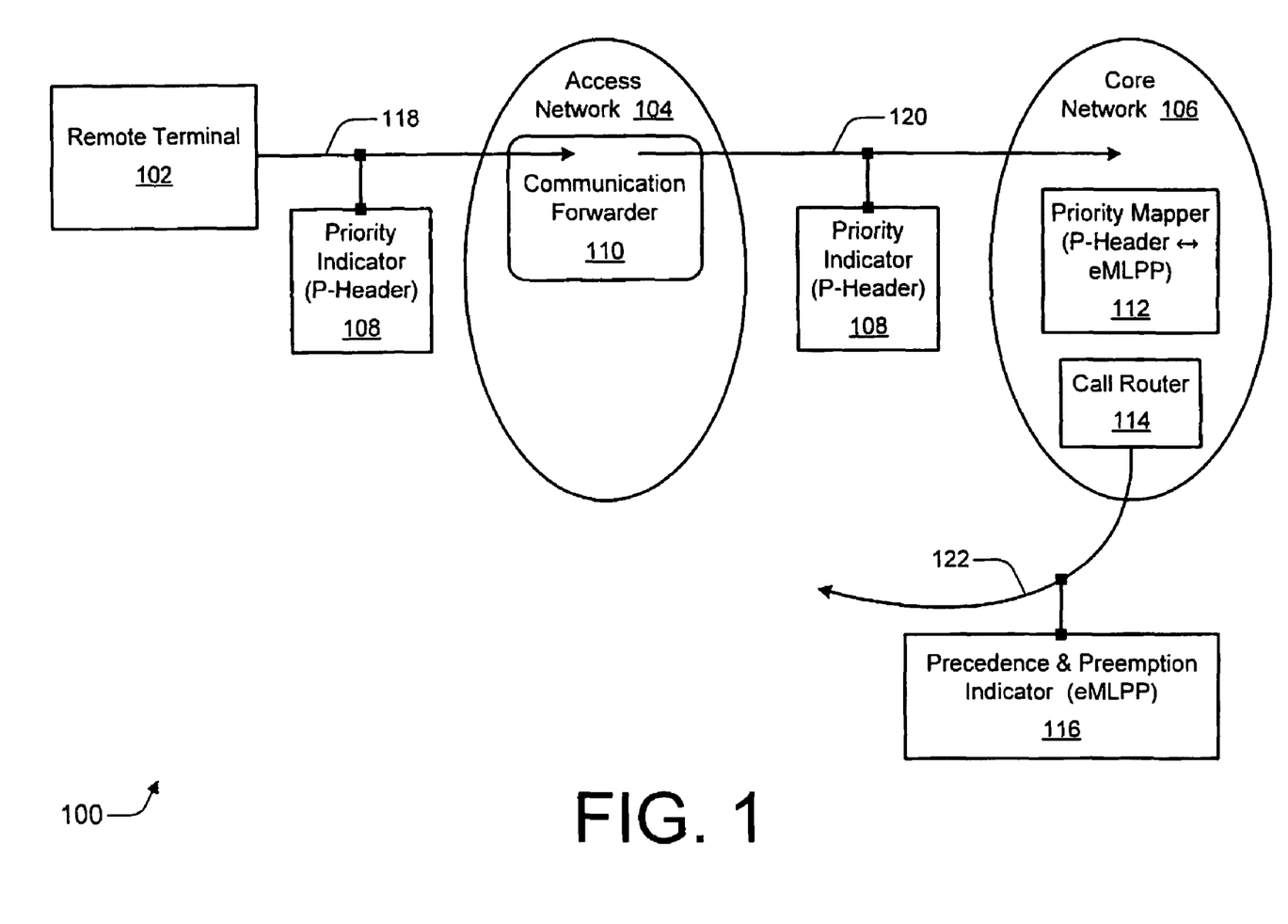
FIG. 1 is a general multi-network diagram illustrating a remote terminal, an access network, and a core network along with examples of a priority mapper and priority indicators.

FIG. 1 is a general multi-network diagram 100 illustrating a remote terminal 102, an access network 104, and a core network 106, along with examples of a priority mapper 112 and priority indicators 108 and 116. As illustrated, multi-network 100 includes a priority indicator 108 that is a Priority-Header, or p-header value, and a precedence and preemption indicator 116 that is an eMLPP value. For an example implementation, p-header value 108 may comport with IETF RFC 3455, Private Header (P-Header) Extensions to the SIP for the 3GPP. Access network 104 includes a communication forwarder 110 that has a communication forwarding functionality. In addition to priority mapper 112, core network 106 includes a call router 114 that has a call routing functionality.

In an example embodiment, remote terminal 102 sends a communication 118 having a p-header value 108 to access network 104. Access network 104 receives communication 118 with p-header value 108 and forwards the communication using communication forwarder 110. Communication 120, which also has p-header value 108, is forwarded to core network 106. Core network 106 receives communication 120 and p-header value 108.

Core network 106 includes priority mapper 112. Priority mapper 112 is to map p-header priorities to eMLPP levels. For example, each p-header value may be mapped to an eMLPP value. In operation, p-header value 108 is mapped to eMLPP value 116 by priority mapper 112. Example implementations of priority mapper 112 are described further herein below with particular reference to FIGS. 3-4 and 5-6.

Within core network 106, a call connection is routed by call router 114. To facilitate the establishment of the call connection, a communication 122 having eMLPP value 116 is transmitted from core network 106. The connection can therefore be established with an eMLPP level instead of or in addition to a p-header priority. Example implementations for, and nodes of, both access network 104 and core network 106 are described below with particular reference to FIGS. 2 and 6.

Figure 2:
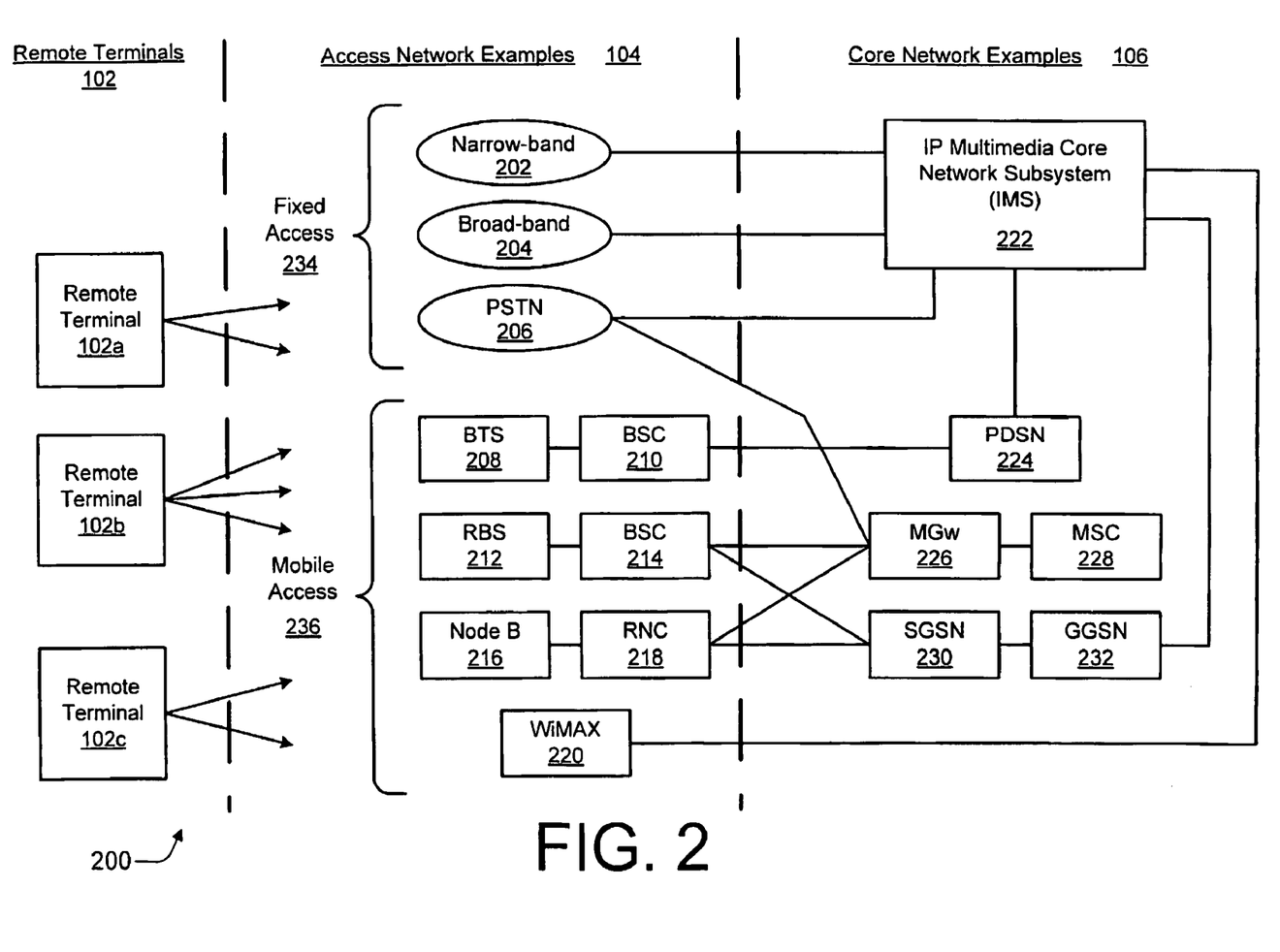
FIG. 2 is a block diagram illustrating example nodes for access networks and core networks.

FIG. 2 is a block diagram 200 illustrating example nodes for access network(s) 104 and core network(s) 106. Block diagram 200 also includes remote terminals 102*a*, 102*b*, and 102*c*. As illustrated, access network 104 includes both fixed access 234 and mobile access 236 examples. Fixed access examples 234 include narrow-band 202, broad-band 204, and PSTN 206 networks. Although only three examples are shown, fixed access 234 may include other network types. Mobile access examples 236 include CDMA/CDMA2000/WCDMA, GSM, UMTS, WiMAX, and so forth. Other mobile access examples include HSPA, GSM/EDGE, and so forth. Example individual nodes for such access schemes include: BTS 208 and BSC 210 (for CDMA), RBS 212 and BSC 214 (for GSM), Node B 216 and RNC 218 (for UMTS), and WiMAX 220 (for WiMAX).

Core network 106 includes multiple example nodes that comprise part of a core network. These example core network 106 nodes include, but are not limited to: IMS node 222, PDSN 224, MGw node 226, MSC node 228, SGSN 230, GGSN 232, and so forth. Typically, PDSN 224 corresponds to CDMA technology, MGw 226 and MSC 228 correspond to GSM technology, and SGSN 230 and GGSN 232 correspond to UMTS technology. IMS node 222, however, generally corresponds to MTSI/MMtel technology. By way of example only, priority mapping may be implemented with MTSI/MMtel connections in conjunction with any of the identified or other fixed or mobile access technologies. For example embodiments generally, priority mapping as described herein may be implemented in any one or more of the nodes of core network 106.

Each of remote terminals 102 can operate in accordance with any one or more of these fixed access 234 and/or mobile access 236 technologies. Hence, a remote terminal 102 may be an MS (for GSM), a UE (for UMTS), an SS (for WiMAX), and so forth. More generally, a remote terminal 102 may be a fixed device, a mobile device, a phone, a personal digital assistant and/or media player, a handset, a computer (e.g., notebook, desktop, etc.), a wireless adaptor module, a combination thereof, and so forth. As is described further herein below with particular reference to FIGS. 7 and 8, a given remote terminal 102 may also move between two or more different technological domains during a single connection via a handover procedure.

Figure 3:
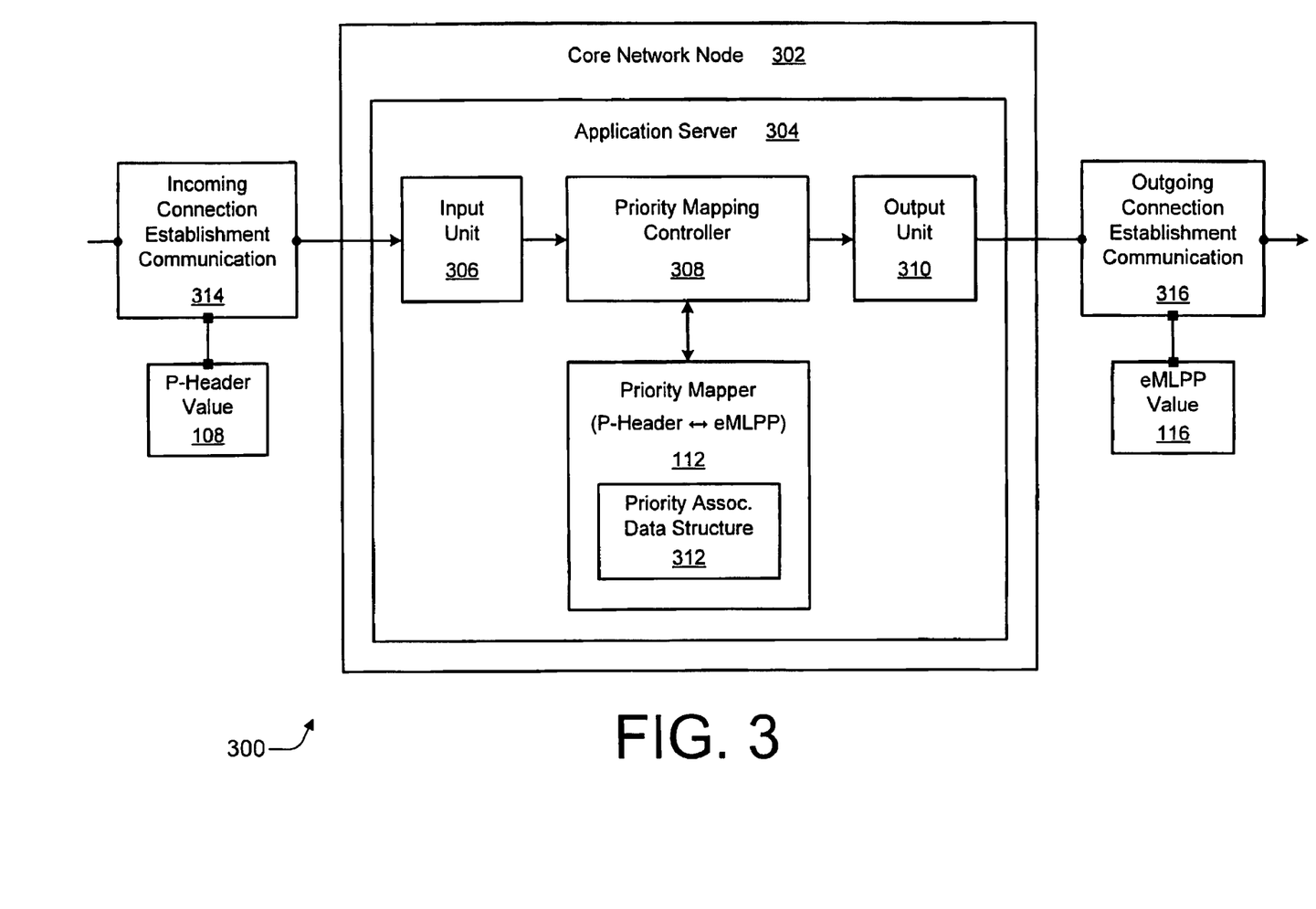
FIG. 3 is a block diagram of an example core network node that is capable of implementing priority mapping with a priority association data structure.

FIG. 3 is a block diagram 300 of an example core network node 302 that is capable of implementing priority mapping with a priority association data structure 312. As illustrated, block diagram 300 includes incoming connection establishment communication 314 and outgoing connection establishment communication 316 in addition to core network node 302. Incoming connection establishment communication 314 includes a p-header value 108, and outgoing connection establishment communication 316 includes an eMLPP value 116.

Core network node 302 includes an application server 304. Application server 304 includes an input unit 306, a priority mapping controller 308, an output unit 310, and a priority mapper 112. Priority mapper 112 includes priority association data structure 312. An example priority association data structure 312 is described herein below with particular reference to FIG. 4. The application server 304 portion of core network node 302 may be realized using, for example, one or more processors, at least one memory, and processor-executable instructions. A description of such components is described herein below with particular reference to FIG. 7.

Input unit 306 and/or output unit 310 may be fully or partially implemented by a receiver, a transmitter, and/or a transceiver (not shown).

In an example embodiment, a communication node is operable with a communications system that implements an eMLPP scheme. The communication node includes: input unit 306, output unit 310, priority mapper 112, and priority mapping controller 308. Input unit 306 is to receive incoming connection establishment communication 314 having p-header value 108 that indicates a priority for a connection to be established. Output unit 310 is to transmit outgoing connection establishment communication 316 having eMLPP value 116 that indicates a precedence and preemption level for the connection to be established.

Priority mapper 112 is to map p-header priorities to eMLPP levels. It includes priority association data structure 312 that associates one or more p-header priorities to each of multiple eMLPP levels. Priority association data structure 312 includes an entry that associates p-header value 108 with eMLPP value 116. Priority mapping controller 308 is to accept incoming connection establishment communication 314 from input unit 306, extract p-header value 108 from incoming connection establishment communication 314, and provide p-header value 108 to priority mapper 112. Priority mapping controller 308 is also to accept from priority mapper 112 the eMLPP value 116 that is associated with p-header value 108 and forward eMLPP value 116 to output unit 310.

The communication node may be a core network node 302. Core network node 302 may be any general or specialized node of a core network 106 (of FIGS. 1 and 2). Examples include, but are not limited to, an IMS node 222, a PDSN 224, a MGw node 226, an MSC node 228, an SGSN 230, a GGSN 232, some combination thereof, and so forth. In an example implementation, if core network node 302 is not an IMS node 222, then outgoing connection establishment communication 316 is transmitted to an IMS node 222 from a core network node of a different technological domain. An example implementation in which core network node 302 is an IMS node 302(IMS) is described herein below with particular reference to FIG. 6.

Figure 4:
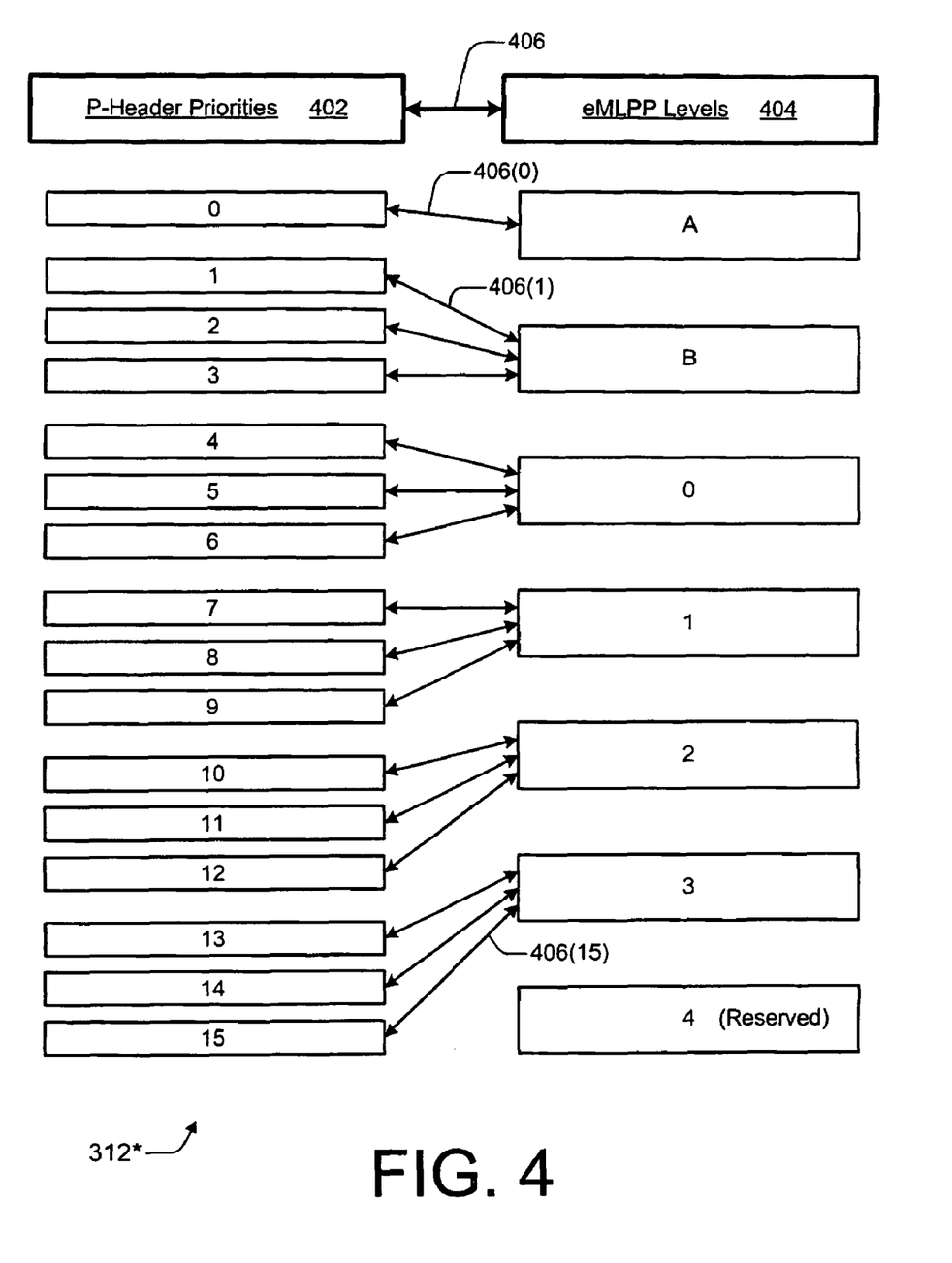
FIG. 4 is a block diagram of an example priority association data structure.

FIG. 4 is a block diagram of an example priority association data structure 312*. As illustrated, priority association data structure 312* includes multiple p-header priorities 402, multiple eMLPP levels 404, and multiple associations 406. P-header priorities 402 may be comprised of any number of different priorities, and eMLPP levels 404 may be comprised of any number of different priority levels. Each p-header priority 402 may be associated with any number of eMLPP levels 404, and vice versa.

However, for an example embodiment, there are sixteen (0-15) p-header priorities 402, and there are seven (A, B, and 0-4) eMLPP levels 404. P-header priority "0" and eMLPP level "A" are considered the highest priorities. Generally, the fifteen p-header priorities 402 are associated 406(0 . . . 15) with six of the eMLPP levels 404. Specifically, example priority associations 406 between a respective p-header priority 402 and a respective eMLPP level 404 are as follows: 0 with A, 1/2/3 with B, 4/5/6 with 0, 7/8/9 with 1, 10/11/12 with 2, and 13/14/15 with 3. With this embodiment, eMLPP level 4 is not associated with a p-header priority, but it is instead reserved for future expansion. The priority mapping associations 406 may be implemented in alternative manners. For example, two p-header priorities 402 may be mapped to each eMLPP level 404, one or more p-header priorities 402 may be reserved, and so forth.

Figure 5:
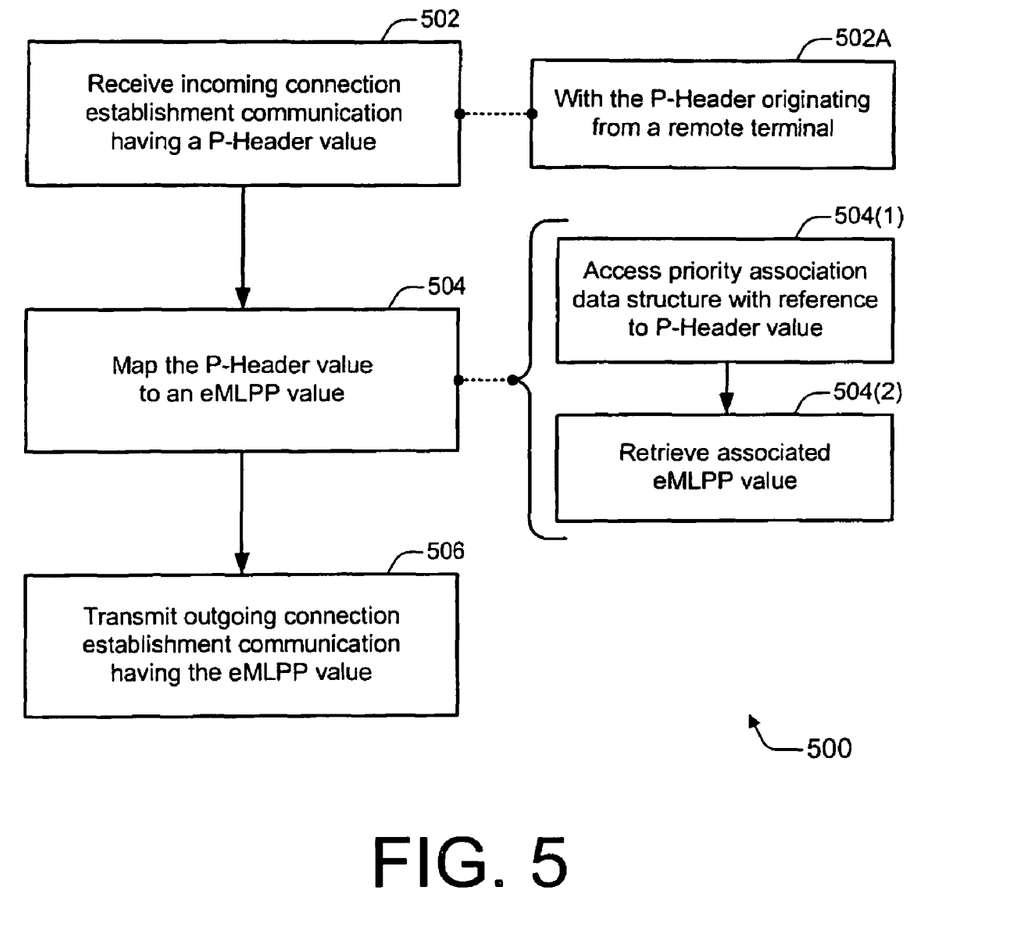
FIG. 5 is a flow diagram of an example method for implementing priority mapping.

FIG. 5 is a flow diagram 500 of an example method for implementing priority mapping. As illustrated, flow diagram 500 includes six blocks 502, 504, 506, 502A, 504(1), and 504(2). Flow diagram 500 may be implemented by a communication node, such as a core network node 302 (of FIG. 3). The actions of flow diagram 500 may be realized with processor-executable instructions. Processor-executable instructions may be embodied as hardware, firmware, software, fixed logic circuitry, combinations thereof, and so forth.

In an example embodiment, flow diagram 500 depicts a method for a communication node with respect to a communications system that implements an eMLPP scheme. The method includes receiving, mapping, and transmitting. At block 502, an incoming connection establishment communication having a p-header value, which indicates a priority for a connection to be established, is received at the communication node.

At block 504, the p-header value is mapped to an eMLPP value that indicates a precedence and preemption level for the connection to be established. At block 506, an outgoing connection establishment communication having the eMLPP value is transmitted from the communication node.

In an example implementation, as indicated at block 502A, the act of receiving may include receiving the incoming connection establishment communication directly or indirectly from a remote terminal that is requesting that the connection be established, with the p-header value originating at the remote terminal.

In another example implementation, as indicated at blocks 504(1) and 504(2), the act of mapping may include (1) accessing a priority association data structure with reference to the p-header value and (2) retrieving from the priority association data structure, at an entry corresponding to the p-header value, the eMLPP value that is associated with the p-header value.

Figure 6:
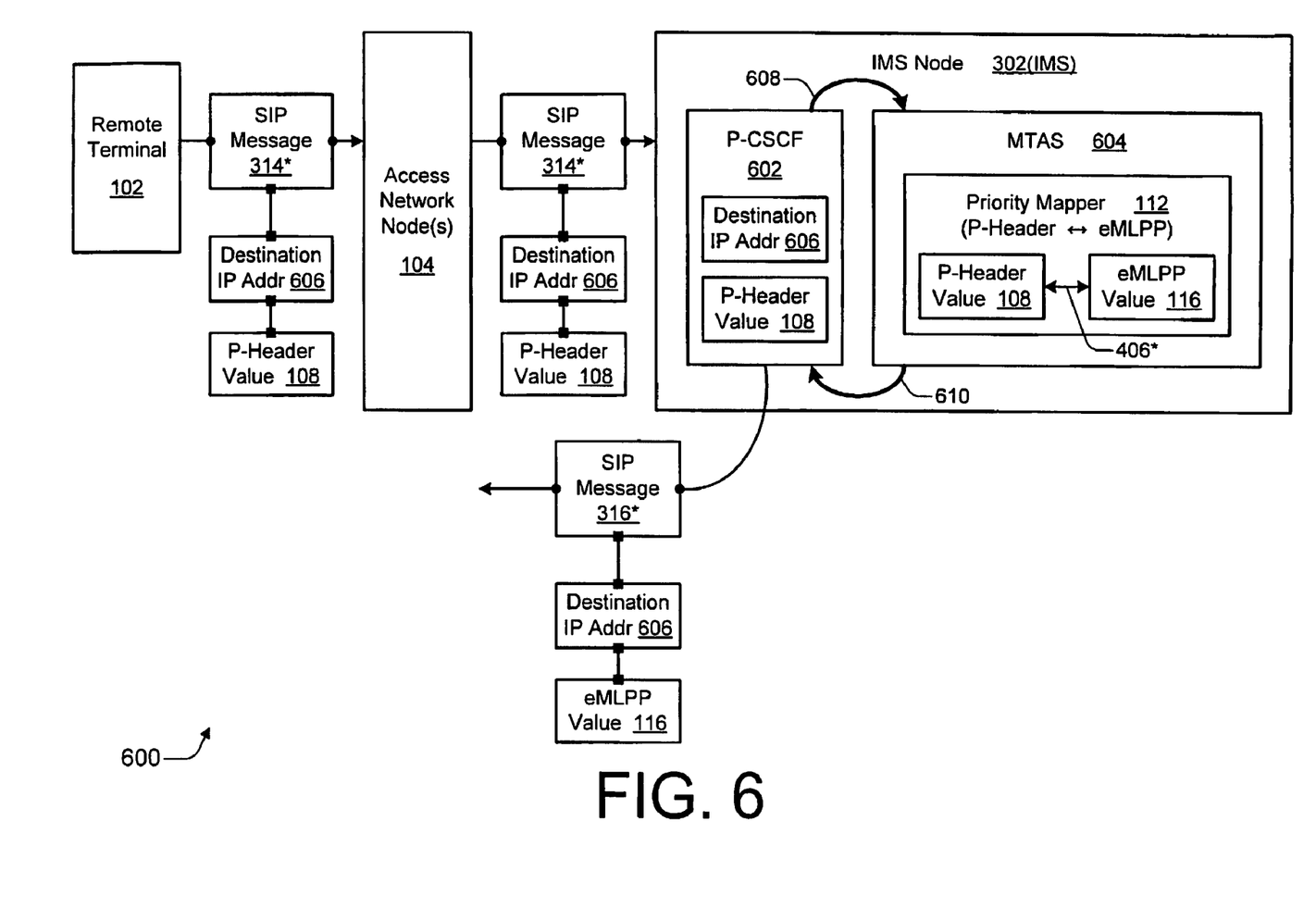
FIG. 6 is a block diagram of an example IMS node that is capable of implementing priority mapping.

FIG. 6 is a block diagram 600 of an example IMS node 302 (IMS) that is capable of implementing priority mapping. As illustrated, block diagram 600 includes remote terminal 102 and one or more access network nodes 104 in addition to IMS node 302 (IMS). IMS node 302 (IMS) includes a P-CSCF portion or entity 602 and an MTAS portion or entity 604. MTAS 604 includes priority mapper 112. Example implementations for CSCF are described in 3GPP and 3GPP2.

With block diagram 600, priority mapping is implemented by IMS node 302 (IMS) in an MTSI/MMTel technological domain. Hence, core network node 302 is implemented by an IMS node 222 (of FIG. 2) in this example. Incoming connection establishment communication 314 is implemented, by way of example only, as a SIP message 314*. An example of SIP technology is that described by RFC 3261, but other SIP technologies may alternatively be implemented.

In operation of an example embodiment, remote terminal 102 transmits SIP message 314*, which includes a destination IP address 606 and a p-header value 108. Optionally, SIP message 314* may be forwarded through one or more access nodes 104. When SIP message 314* is received at IMS node 302(IMS), it is accepted by P-CSCF 602. P-CSCF 602 extracts destination IP address 606 and p-header value 108.

P-CSCF 602 provides at least p-header value 108 to MTAS 604 at communication 608. MTAS 604 accepts p-header value 108 and then supplies it to priority mapper 112. Priority mapper 112 includes an association 406* of p-header value 108 and eMLPP value 116 (e.g., as part of a priority association data structure 312). Priority mapper 112 returns eMLPP value 116 to MTAS 604. MTAS 604 provides eMLPP value 116 to P-CSCF 602 at communication 610.

P-CSCF 602 receives eMLPP value 116 from MTAS 604. P-CSCF 602 routes the connection to be established for remote terminal 102. P-CSCF 602 transmits an outgoing connection establishment communication 316, which is implemented as another SIP message 316* in block diagram 600. By way of example only, SIP message 316* may be implemented as a SIP URL/URI message (if it is being transmitted to an IMS or WiMAX node) or as a TEL URI message (if it is being transmitted to a circuit-switched node). SIP message 316* includes destination IP address 606 and eMLPP value 116 (and possibly p-header value 108). It is transmitted towards a network node operating within a technological domain that is capable of establishing the connection for remote terminal 102 with the intended destination.

Thus, for certain example embodiment(s), the eMLPP for MTSI/MMTel can be extended to other remote terminals by mapping the p-header priority from the remote terminal to an eMLPP priority level as defined in the MTAS or IMS application server. In an example implementation, the p-header from a remote terminal is applied to different QoS levels in the IP-CAN and then mapped to an eMLPP priority level in the MTAS via the IMS core based on the QoS and the priority level to which the subscriber is subscribed.

The eMLPP can therefore be used to assign multiple levels of priorities to the MTSI/MMTel subscribers. The priority checks can operate in process with association of the p-header as transferred from the remote terminal. The first check can be performed in the access network (e.g., within GSM/EDGE RBS/BSC, WCDMA HSPA Node B/RNC, etc.). For example, the priority levels as defined in the GSM BSC or WCDMA RNC can be used to perform the first check. Based on this first check, the call can be routed with an associated priority to the packet core (e.g., SGSN/GGSN). The SGSN can map the diffserv level to the priority and then route it to the P-CSCF.

The P-CSCF can look at the destination IP address and p-header for the call. If the call is not a WPS or emergency call, P-CSCF can route the IP address and p-header to the MTAS node or entity via an ISC interface. The MTAS, which supports eMLPP for MMtel/MTSI call connections in accordance with priority mapping as described herein, can service the call based on the QOS subscribed to by the subscriber and the level of eMLPP assigned to the call by mapping the p-header to the appropriate associated eMLPP level.

In the case of an HSPA call with respect to the packet core when the call is a VoIP/MMtel/MTSI call, the p-header from the remote terminal can be transferred to the P-CSCF entity of the IMS core. The P-CSCF can look at the three-byte p-header and check the priority of the call. If the call has been assigned the highest level of priority service that can be provided to the subscriber, then this applies to the highest level of priority setup in the access network such that any other types of calls are either preempted or held in queue to service this call of the highest priority. In cases of congestion, the calls with the highest level of priority are serviced, and the calls overall are queued in a similar manner using MTAS.

Figure 7:
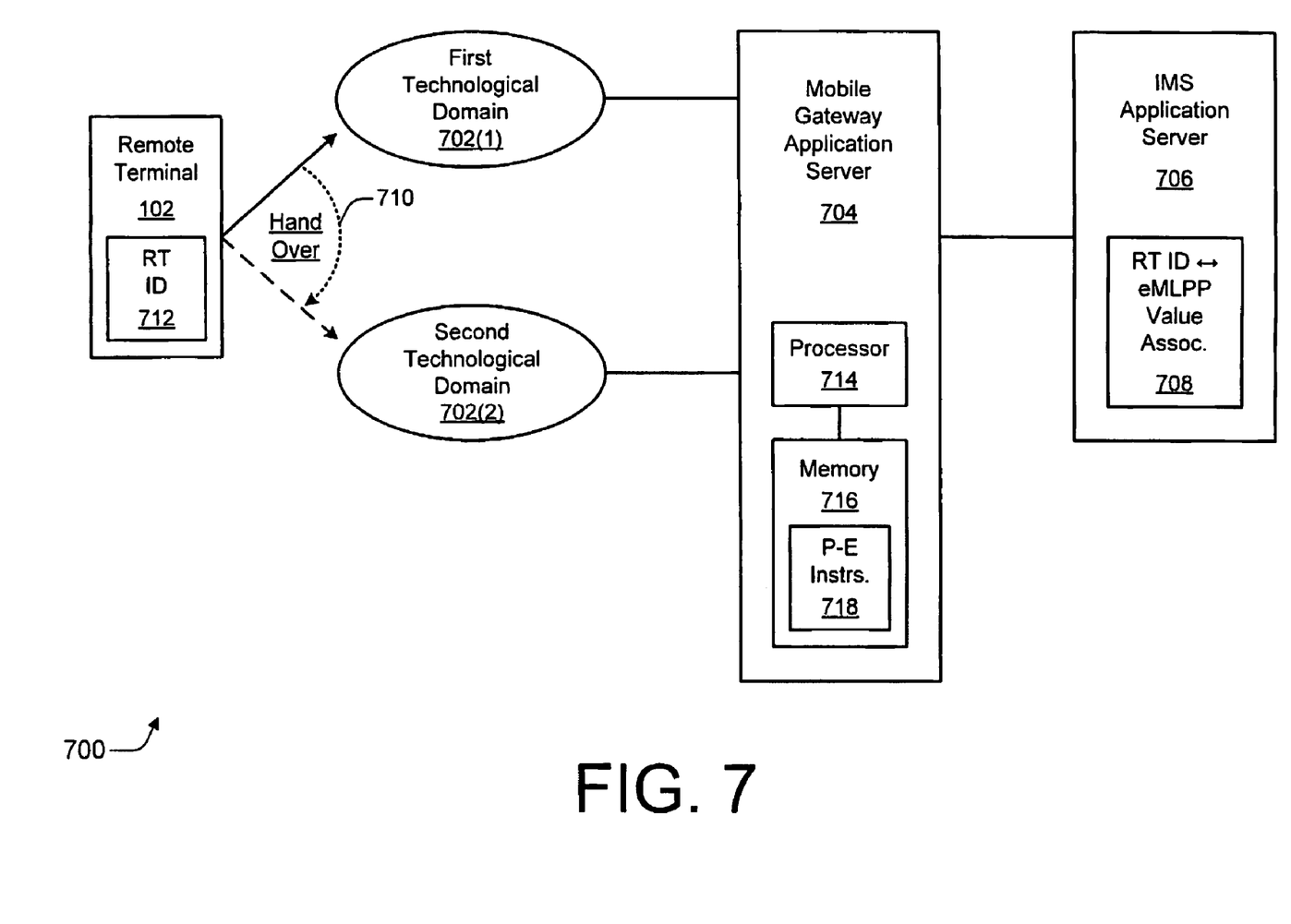
FIG. 7 is a block diagram illustrating an example scheme for voice call continuity with a preexisting precedence and preemption level.

FIG. 7 is a block diagram illustrating an example scheme 700 for voice call continuity with a preexisting precedence and preemption level. As illustrated, voice call continuity scheme 700 includes a remote terminal 102, two different technological domains 702(1) and 702(2), a mobile gateway application server 704, and an IMS application server 706. Remote terminal 102 includes or is associated with a remote terminal identifier 712. Mobile gateway application server 704 includes one or more processors 714, at least one memory 716, and processor-executable instructions 718. IMS application server 706 includes an association 708 between the remote terminal identifier and the existing eMLPP value.

For an example embodiment, each technological domain 702 corresponds to a different communications technology such as CDMA technology, GSM technology, UMTS technology, WiMAX technology, Wi-Fi technology, MTSI/MMtel technology, and so forth. In operation, remote terminal 102 is involved in a handover procedure 710 from first technological domain 702(1) to second technological domain 702(2). Prior to the start of handover procedure 710, remote terminal 102 had a connection established via first technological domain 702(1) at a particular eMLPP value.

When this particular eMLPP value was assigned (e.g., by mapping from a p-header priority or through another mechanism), IMS application server 706 retained an association 708 of remote terminal identifier 712 and eMLPP value 116 (not explicitly shown in FIG. 7). From time to time, remote terminal 102 may be involved in an inter-technology domain handover 710. When this occurs, the current connection can be continued via the new technological domain at the preexisting eMLPP level by retrieving the preexisting eMLPP value from association 708 at IMS application server 706.

An example method for such voice call continuity is described herein below with particular reference to the sequence signaling diagram of FIG. 8. The acts performed by mobile gateway application server 704 during the procedure of the sequence diagram of FIG. 8 may be implemented by processor-executable instructions 718. For example implementations with processor-executable instructions, the at least one memory 716 includes processor-executable instructions 718. Processor(s) 714 are operably coupled to memory 716. Processor(s) 714 are capable of executing processor-executable instructions 718 to effectuate performance of functions that are described herein.

Remote terminal identifier 712 may be an identifier that corresponds to remote terminal 102 generally and/or that corresponds to a current connection thereof specifically. Thus, remote terminal identifier 712 may be an originating number (e.g., IP address, terminal ID, telephone number, subscriber identification number, etc.; of the remote terminal, may be a connection-oriented number (e.g., session ID, other specialized assigned value), some combination thereof, and so forth.

Figure 8:
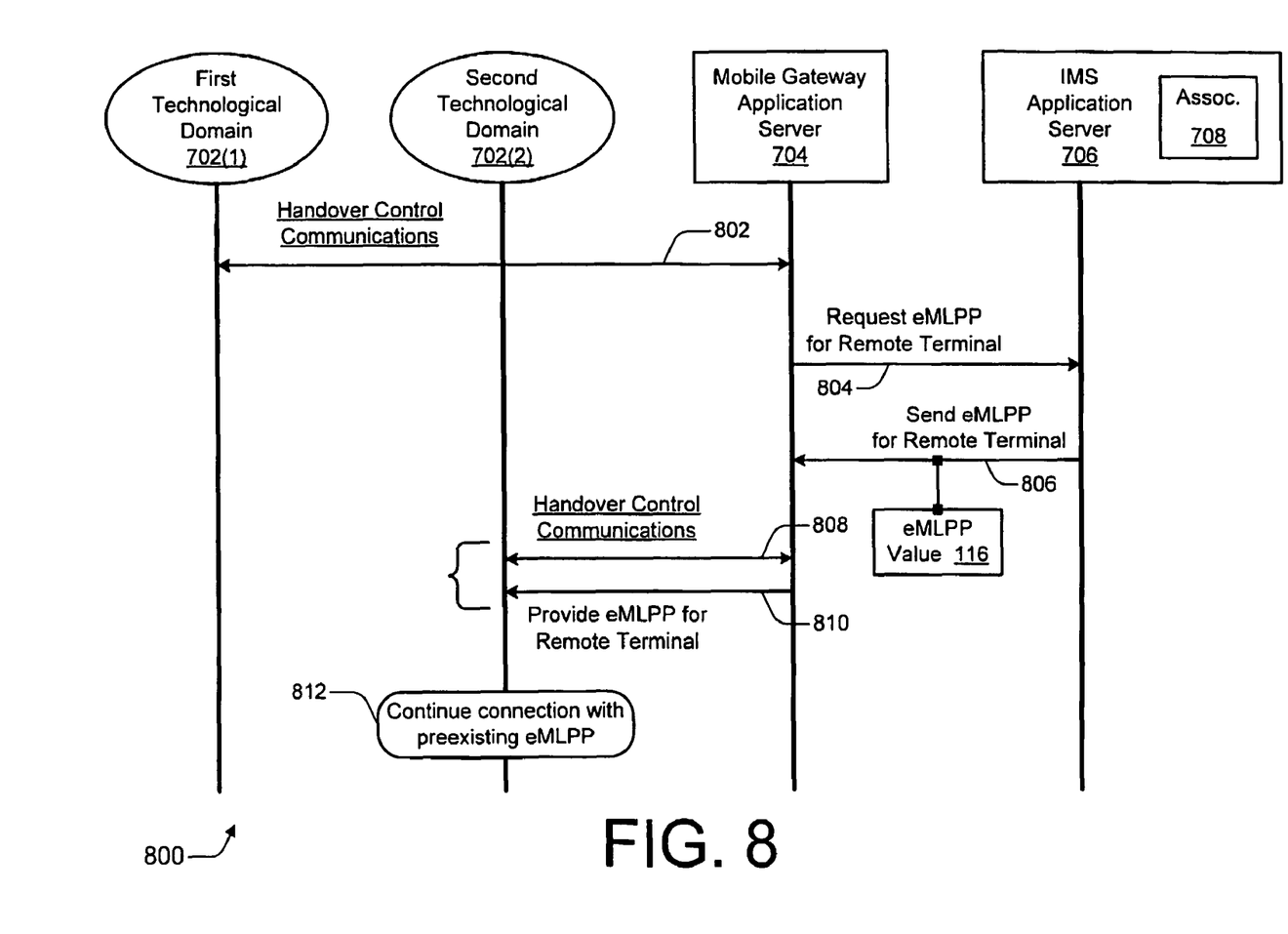
FIG. 8 is an example sequence diagram for voice call continuity with a preexisting precedence and preemption level.

FIG. 8 is an example sequence diagram 800 for voice call continuity with a preexisting precedence and preemption level. As illustrated, sequence diagram 800 includes first technological domain 702(1), second technological domain 702(2), mobile gateway application server 704, and IMS application server 706. Sequence diagram 800 pertains to a handover of a remote terminal from first technological domain 702(1) to second technological domain 702(2). When a current connection was established for the remote terminal, an association 708 between a remote terminal ID and the eMLPP value for the connection was stored. Although sequence diagram 800 is described primarily in terms of acts performed by mobile gateway application server 704, these acts may alternatively be performed by a different node/entity.

In an example embodiment, a method with respect to a communications system that implements an eMLPP scheme is performed by a communication node, such as mobile gateway application server 704. One or more communications 802 that are related to a handover operation for a current connection are received from first technological domain 702(1). Handover control communications 802 include an identifier of a remote terminal that is involved in the handover operation (e.g., remote terminal identifier 712 of FIG. 7).

An eMLPP value that is associated with the remote terminal for the current connection is requested 804 from IMS application server 706 with reference to the remote terminal identifier. The requested eMLPP value indicates a preexisting precedence and preemption level for the current connection. IMS application server 706 retrieves the eMLPP value from the stored association 708. IMS application server 706 transmits the eMLPP value 116 to mobile gateway application server 704.

This eMLPP value 116 that is associated with the remote terminal for the current connection is received in a message communication 806. The eMLPP value is provided 810 to second technological domain 702(2) that is a target of the handover operation. The eMLPP value may be provided in a separate communication or as part of handover control communications 808. In this manner, the current connection can be continued at 812 via second technological domain 702(2) with the eMLPP level that was preexisting with respect to first technological domain 702(1).

Thus, for certain example embodiment(s), the eMLPP for MTSI/MMtel can be implemented with multiple levels of QoS and voice call continuity such that emergency voice calls can be continued between IMS/WiMAX and a non-IMS network (e.g., GSM, WCDMA, CDMA2000, etc.). This scheme comports with WPS/GETS regulations for emergency calls and public safety calls, including disaster recovery scenarios. The handling of the eMLPP feature in such cases can be at least partially accomplished in an MTAS node and/or in a mobile IMS application server that supports MTSI/MMtel.

In normal call cases, the priority can be set based on the type of service and the QoS to which the user is subscribed. There can be a mapping of the QoS in the access network to a diffserv in the packet core network. This can be mapped to the p-header in case of a VoIP call facilitated by MTAS via the IMS core with the eMLPP feature being implemented as described herein. Voice call continuity schemes as described herein can be supported by mobility gateway application server(s) that are situated between MTSI/MMtel and any of, e.g., circuit switched GSM, WCDMA, CDMA2000, WiMAX, fixed access technologies, and so forth.

Hence, different embodiment(s) of the invention can offer one or more advantages. Generally, eMLPP for MTSI/MMtel is extended to other remote terminals by mapping p-header priorities to eMLPP levels. More specifically, this can enable an efficient and new mechanism for assigning multiple levels of QoS with voice call continuity. This can also enable different types of applications in areas such as Emergency Calling, Public Safety, National Security, etc. along with applications in the areas of GETS and WPS types of calls using MTSI/MMtel in the event of congestion in the mobile network. The priority mapping to facilitate precedence and preemption is generally applicable to commercial uses of eMLPP for subscribers who are subscribed to different levels of QoS. For example, an operator can define a mechanism using implementations of priority mapping as described herein to assign different levels of QoS to the subscribers and then apply a defined charging model accordingly based on the eMLPP.

Although multiple embodiments of the present invention have been illustrated in the accompanying Drawings and described in the foregoing Detailed Description, it should be understood that the invention is not limited to the disclosed embodiments, for it is also capable of numerous rearrangements, modifications and substitutions without departing from the scope of the invention as set forth and defined by the following claims.

What is claimed is:

1. A communication node operable with a communications system that implements an enhanced multi-level precedence and preemption, eMLPP, scheme, the communication node comprising:

11 an input unit to receive an incoming connection establishment communication having a priority-header value that indicates a priority for a connection to be established, wherein the incoming connection establishment communication was sent by a remote terminal that was not pre-configured to establish a precedence and preemption level in accordance with the eMLPP scheme;

a priority mapper to map priority-header priorities to eMLPP levels, said priority mapper including a priority association data structure that associates one or more priority-header priorities to each of multiple eMLPP levels;

a priority mapping controller to accept the incoming connection establishment communication from said input unit, to extract the priority-header value from the incoming connection establishment communication, to provide the priority-header value to said priority mapper where the priority association data structure includes an entry that associates the extracted priority-header value with an eMLPP value, to accept from said priority mapper the eMLPP value that is associated with the extracted priority-header value; and an output unit to receive the eMLPP value from the priority mapping controller and to transmit an outgoing connection establishment communication having the received eMLPP value that indicates a precedence and preemption level for the connection to be established.

2. The communication node as recited in claim 1, further comprising at least one memory and one or more processors; wherein said input unit, said output unit, said priority mapper, and said priority mapping controller are implemented as processor-executable instructions stored by the at least one memory; and wherein the one or more processors are adapted to execute the processor-executable instructions.

3. The communication node as recited in claim 1, wherein the communication node comprises a core network node.

4. The communication node as recited in claim 3, wherein the core network node comprises: a packet data serving node, PDSN, of a network operating in accordance with code division multiple access, CDMA or CDMA2000, technology; a media gateway, MGw, or a mobile switching center, MSC, node of a network operating in accordance with global system for mobile communications, GSM, technology; or a serving general-packet-radio-service, GPRS, service node, SGSN, or a gateway GPRS service node, GGSN, of a network operating in accordance with universal mobile telecommunications system, UMTS, technology.

5. A communication node operable with a communications system that implements an enhanced multi-level precedence and preemption, eMLPP, scheme, the communication node comprising:

an input unit to receive an incoming connection establishment communication having a priority-header value that indicates a priority for a connection to be established;

an output unit to transmit an outgoing connection establishment communication having an eMLPP value that indicates a precedence and preemption level for the connection to be established;

a priority mapper to map priority-header priorities to eMLPP levels, said priority mapper including a priority association data structure that associates one or more priority-header priorities to each of multiple eMLPP levels, the priority association data structure including an entry that associates the priority-header value with the eMLPP value; and a priority mapping controller to accept the incoming connection establishment communication from said input unit, to extract the priority-header value from the incoming connection establishment communication, to provide the priority-header value to said priority mapper, to accept from said priority mapper the eMLPP value that is associated with the priority-header value, and to forward the eMLPP value to said output unit;

wherein the communication node comprises a core network node;

wherein the core network node comprises: a packet data serving node, PDSN, of a network operating in accordance with code division multiple access, CDMA or CDMA2000, technology; a media gateway, MGw, or a mobile switching center, MSC, node of a network operating in accordance with global system for mobile communications, GSM, technology; or a serving general-packet-radio-service, GPRS, service node, SGSN, or a gateway GPRS service node, GGSN, of a network operating in accordance with universal mobile telecommunications system, UMTS, technology; and wherein said output unit of the core network node is to transmit the outgoing connection establishment communication having the eMLPP value towards an internet protocol, IP, multimedia core network subsystem, IMS, node of a network operating in accordance with Mobile Telephony Service for IMS/Multi-Media Fixed and Wireless Telephony, MTSI/MMTeI.

6. A communication node operable with a communications system that implements an enhanced multi-level precedence and preemption, eMLPP, scheme, the communication node comprising:

an input unit to receive an incoming connection establishment communication having a priority-header value that indicates a priority for a connection to be established;

an output unit to transmit an outgoing connection establishment communication having an eMLPP value that indicates a precedence and preemption level for the connection to be established;

a priority mapper to map priority-header priorities to eMLPP levels, said priority mapper including a priority association data structure that associates one or more priority-header priorities to each of multiple eMLPP levels, the priority association data structure including an entry that associates the priority-header value with the eMLPP value; and a priority mapping controller to accept the incoming connection establishment communication from said input unit, to extract the priority-header value from the incoming connection establishment communication, to provide the priority-header value to said priority mapper, to accept from said priority mapper the eMLPP value that is associated with the priority-header value, and to forward the eMLPP value to said output unit;

wherein the communication node comprises a core network node; and wherein the core network node comprises an internet protocol, IP, multimedia core network subsystem, IMS, node of a network operating in accordance with Mobile Telephony Service for IMS/Multi-Media Fixed and Wireless Telephony, MTSI/MMTeI.

7. The communication node as recited in claim 6, wherein the incoming connection establishment communication includes the priority-header value and an IP address of a destination; and wherein the IMS node comprises:

a proxy-call/session control function, P-CSCF, portion comprising said input unit, said output unit, and said priority mapping controller; the P-CSCF to extract the priority-header value and the IP address from the incoming connection establishment communication and to provide at least the priority-header value; and a mobile telephony application server, MTAS, portion comprising said priority mapper; the MTAS to accept from the P-CSCF at least the priority-header value and to provide the associated eMLPP value using the priority association data structure.

8. The communication node as recited in claim 7, wherein the P-CSCF is to route the connection to be established; and wherein said output unit is to transmit the outgoing connection establishment communication having the eMLPP value towards a network node operating within a technological domain that is capable of establishing the connection to the destination.

9. The communication node as recited in claim 7, wherein the MTAS is to store the eMLPP value in association with a remote terminal for which the connection is to be established; and wherein the MTAS is to receive a request from a mobile gateway application server for the eMLPP value that is associated with the remote terminal for which the connection has been established, and the MTAS is to send to the mobile gateway application server in response the eMLPP value that is associated with the remote terminal for which the connection has been established.

10. A method for a communication node with respect to a communications system that implements an enhanced multi-level precedence and preemption, eMLPP, scheme, the method comprising:

receiving at the communication node an incoming connection establishment communication having a priority-header value that indicates a priority for a connection to be established, wherein the incoming connection establishment communication was sent by a remote terminal that was not pre-configured to establish a precedence and preemption level in accordance with the eMLPP scheme;

mapping the priority-header value to an eMLPP value that indicates a precedence and preemption level for the connection to be established; and transmitting from the communication node an outgoing connection establishment communication having the eMLPP value.

11. The method for the communication node as recited in claim 10, wherein said act of receiving comprises:

receiving the incoming connection establishment communication directly or indirectly from a remote terminal that is requesting that the connection be established, the priority-header value originating at the remote terminal.

12. The method for the communication node as recited in claim 10, wherein said act of mapping comprises:

accessing a priority association data structure with reference to the priority-header value; and retrieving from the priority association data structure at an entry corresponding to the priority-header value the eMLPP value that is associated with the priority-header value.

13. A method for a communication node with respect to a communications system that implements an enhanced multi-level precedence and preemption, eMLPP, scheme, the method comprising:

receiving at the communication node an incoming connection establishment communication having a priority-header value that indicates a priority for a connection to be established;

mapping the priority-header value to an eMLPP value that indicates a precedence and preemption level for the connection to be established;

transmitting from the communication node an outgoing connection establishment communication having the eMLPP value;

wherein the incoming connection establishment communication comprises a session initiation protocol, SIP, uniform-universal resource locator/uniform resource identifier, URL/URI, message; and wherein said act of receiving comprises:

receiving the SIP URL/URI message that includes the priority-header value and an IP address of a destination for the connection to be established.

14. A method for a communication node with respect to a communications system that implements an enhanced multi-level precedence and preemption, eMLPP, scheme, the method comprising:

receiving at the communication node an incoming connection establishment communication having a priority-header value that indicates a priority for a connection to be established;

mapping the priority-header value to an eMLPP value that indicates a precedence and preemption level for the connection to be established;

transmitting from the communication node an outgoing connection establishment communication having the eMLPP value;

wherein the communication node comprises an internet protocol, IP, multimedia core network subsystem, IMS, node; and wherein the method further comprises:

at a proxy-call/session control function, P-CSCF, portion of the IMS node, extracting the priority-header value from the incoming connection establishment communication and providing the priority-header value to a mobile telephony application server, MTAS, portion of the IMS node; and at the MTAS portion of the IMS node, performing said act of mapping and providing the eMLPP value to the P-CSCF portion of the IMS node.

15. A method for a communication node with respect to a communications system that implements an enhanced multi-level precedence and preemption, eMLPP, scheme, the method comprising:

receiving at the communication node an incoming connection establishment communication having a priority-header value that indicates a priority for a connection to be established;

mapping the priority-header value to an eMLPP value that indicates a precedence and preemption level for the connection to be established;

transmitting from the communication node an outgoing connection establishment communication having the eMLPP value;

wherein the communication node comprises an internet protocol, IP, multimedia core network subsystem, IMS, node; and wherein the method further comprises:

storing the eMLPP value in association with an identifier for a remote terminal for which the connection is to be established;

receiving a request from a mobile gateway application server for the eMLPP value that is associated with the remote terminal for which the connection has been established; and sending to the mobile gateway application server the eMLPP value that is associated with the remote terminal for which the connection has been established.

* * * * *

UNITED STATES PATENT AND TRADEMARK OFFICE
CERTIFICATE OF CORRECTION

| | | |
|---|---|---|
| PATENT NO. | : 8,195,120 B2 | Page 1 of 1 |
| APPLICATION NO. | : 12/046000 | |
| DATED | : June 5, 2012 | |
| INVENTOR(S) | : Khan | |

It is certified that error appears in the above-identified patent and that said Letters Patent is hereby corrected as shown below:

In Column 1, Line 31, delete "TETF" and insert -- IETF --, therefor.

In Column 3, Line 65, delete "maybe" and insert -- may be --, therefor.

In Column 7, Line 47, delete "SIPmessage" and insert -- SIP message --, therefor.

In Column 8, Line 39, delete "QOS" and insert -- QoS --, therefor.

In Column 9, Line 36, delete "etc.;" and insert -- etc.) --, therefor.

In Column 12, Line 26, in Claim 5, delete "MTSI/MMTeI." and insert -- MTSI/MMTel. --, therefor.

In Column 12, Line 59, in Claim 6, delete "MTSI/MMTeI." and insert -- MTSI/MMTel. --, therefor.

Signed and Sealed this
Thirteenth Day of November, 2012

David J. Kappos
*Director of the United States Patent and Trademark Office*